United States Patent
Nandagopal et al.

(10) Patent No.: US 8,280,928 B2
(45) Date of Patent: Oct. 2, 2012

(54) MULTI-LEVEL ENMESHED DIRECTORY STRUCTURES

(75) Inventors: Thyagarajan Nandagopal, Edison, NJ (US); Thomas Y. Woo, Short Hills, NJ (US)

(73) Assignee: Alcatel Lucent, Paris (FR)

( * ) Notice: Subject to any disclaimer, the term of this patent is extended or adjusted under 35 U.S.C. 154(b) by 547 days.

(21) Appl. No.: 12/415,375

(22) Filed: Mar. 31, 2009

(65) Prior Publication Data

US 2010/0251123 A1    Sep. 30, 2010

(51) Int. Cl.
*G06F 17/30* (2006.01)

(52) U.S. Cl. .................................................... 707/821

(58) Field of Classification Search ........... 707/821–829
See application file for complete search history.

(56) References Cited

U.S. PATENT DOCUMENTS

2004/0148296 A1* 7/2004 Schaepe et al. ............. 707/100
2008/0279273 A1* 11/2008 Liang ...................... 375/240.01

* cited by examiner

*Primary Examiner* — Thu-Nguyet Le
(74) *Attorney, Agent, or Firm* — Wall + Tong, LLP

(57) ABSTRACT

A method for creating a multi-level enmeshed structure is provided. The multi-level enmeshed directory structure of the present embodiments contain objects described by multiple object descriptors, which can be thought of as tags. Each object can be accessed by any one of the descriptors that describe the object and the descriptors of an object are also accessible.

20 Claims, 6 Drawing Sheets

MULTI-LEVEL ENMESHED DIRECTORY STRUCTURES

FIELD OF THE INVENTION

This invention relates to directory structures in general and, in particular, to a multi-level enmeshed directory structure.

BACKGROUND

A file system is a method for storing and organizing computer files and the data they contain to make it easy to find and access the data. File systems may use a data storage device such as hard disk or CD-ROM and involve maintaining the physical location of the files; they might provide access to data on a file server by acting as clients for a network protocol (e.g., NFS, SMB, or IP clients), or they may be virtual and exist only as an access method for virtual data (e.g., procfs). A file system is distinguished from a directory service. More formally, a file system is a special purpose database for the storage, organization, manipulation, and retrieval of data. There are different types of file systems, for example, disk file systems, flash file systems, database file systems, transactional file systems, network file systems, special purpose file systems and flat file systems etc. In contrast, a directory is an entity in a file system, which contains a group of files and/or other directories.

Conventional approaches to directory structures limit the flexibility with which objects can be described, and how multiple objects can be compared with each other. Specifically, conventional directory structures typically associate an object with a unique descriptor (such as a filename contained in a directory). These descriptors themselves can then be recursively associated with another higher-level descriptor. Thus, a hierarchical descriptor structure is realized (such as a file system directory), wherein there is a unique chain of hierarchically ordered descriptors that lead to an object. In a typical file system, there can be multiple paths to a single object such as a file using hard/symbolic links, but one can infer only one path by a descriptor traversal starting from the object itself. This system is referred to as a simple directory structure.

A different notion of object descriptors arises when one uses multiple object descriptors to describe a single object. These are similar to the idea of tags used in current Web based applications, such as Flickr, deli.cio.us, etc., where a single file, bookmark or picture is described using various key words. However, the structure of these descriptors is rather flat in that there is no ascribed relationship between the various descriptors codified in the descriptor structure. While there are different ways to describe both a given object and multiple objects associated with any given descriptor, it is not possible to infer relationships between multiple descriptors. This system is referred to as a flat-tag structure.

SUMMARY

Various deficiencies of the prior art are addressed by the present embodiments of a method for creating a multi-level enmeshed directory structure. Specifically, one embodiment provides a method for generating a multi-level hierarchical database structure, the method comprising: selecting an initial data object; creating one or more descriptors associated with the data object wherein each of said descriptors are further associated with one or more corresponding descriptors thereby forming a multi-level relational tree; determining the relationship between the one or more descriptors; creating a hierarchical structure linking the different levels of descriptors; and updating a corresponding database.

Another embodiment provides a network management system communicatively coupled to one or more element management systems adapted to perform a method for creating a multi-level hierarchical database structure, comprising: a processor for executing software instructions received from a memory to perform thereby a method for, the method comprising: linking each of a plurality of data objects to multiple respective descriptors, each of said descriptors being linked with one or more predecessor tags; and identifying a single descriptor that links a list of objects and two or more predecessor descriptors linking a single descriptor thereby establishing the relationships between different descriptors relative to themselves and to the initial data object.

Yet another embodiment of the invention provides a computer readable medium for storing instructions which, when executed by one or more processors communicatively coupled to a network, perform a method for creating a multi-level hierarchical database structure, comprising: linking an object to multiple descriptors describing said object, each of said descriptors being identified by one or more predecessor descriptors linked to the descriptor; and identifying, a single descriptor that links a list of objects and tow or more predecessor descriptors linking a single descriptor.

BRIEF DESCRIPTION OF THE DRAWINGS

The teachings of the present embodiments can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present embodiments are primarily described within the context of a method for creating a multi-level enmeshed directory structure. However, those skilled in the art and informed by the teachings herein will realize that the invention is also applicable to other technical areas and/or embodiments.

Figure 1:
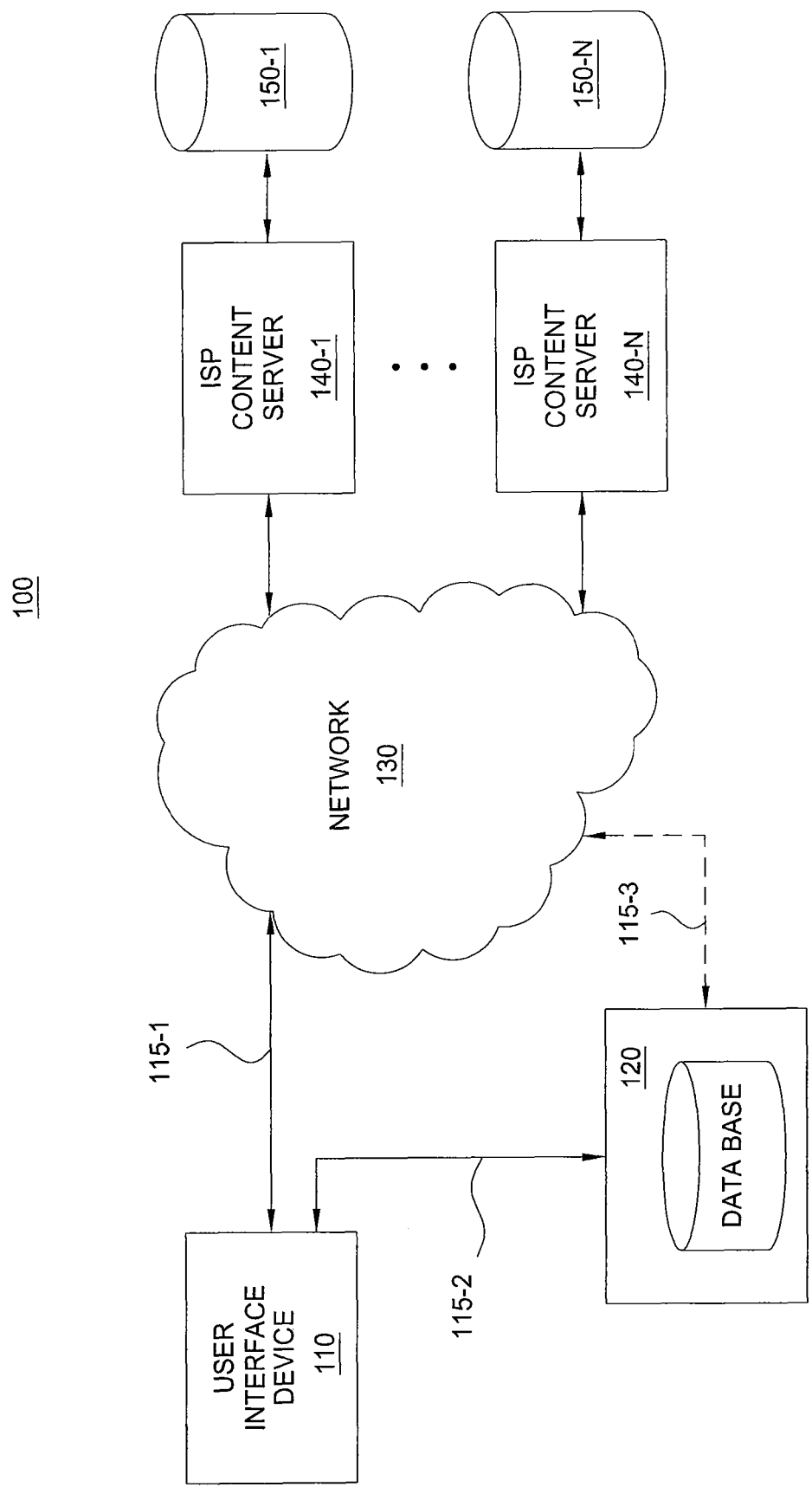
FIG. 1 depicts a block diagram of an information delivery system benefiting from one embodiment.

FIG. 1 depicts a block diagram of an information delivery system benefiting from one embodiment of the Multi-Level Enmeshed Directory Structures disclosed herein. Specifically, the information delivery system 100 of FIG. 1 comprises a user interface device 110, a database 120, one or more Internet Service Providers (ISP) content servers 140-1 to 140-N (collectively content servers 140) and associated databases 150-1 to 150-N (collectively databases 150).

User interface device 110 is a server or any computer including a processor, memory and input/output circuitry that executes at the processor software stored in the memory to implement thereby the Multi-Level Enmeshed Directory Structures system as described herein. In one embodiment, the user interface device 110 is implemented using a computer such as depicted below with respect to FIG. 6. Generally speaking, any Internet enabled device such as a computer, personal digital assistant (PDA), cellular telephone and the like capable of accessing the Internet may implement the various embodiments described herein. While personal computers are generally discussed within the context of the description, the use of any device having similar functionality is considered to be within the scope of the present embodiments.

The user of the user interface device 110 in one embodiment composes a query and interacts with database 120 or ISP content server 140. In one embodiment, the user interacts with database 120 via link 115-2. In other embodiment, the user interacts with database 120 via link 115-1 through the network and link 115-3. In one embodiment, link 115-1 extends over great distance and is a cable, satellite or fiber optic link, a combination of such links or any other suitable communications path. In other embodiments, link 115-1 extends over a short distance. In other embodiments, link 115-2 may be a local area network where both user interface device 110 and database 120 reside in the same general location, or may be network connections between geographically distributed systems, including network connection over the Internet.

Network 130 may be a local area network where both user 110 and ISP 140 reside in the same general location, or may be network connections between geographically distributed systems, including network connection over the Internet. User interface device 110 generally includes a central processing unit (CPU) connected by a bus to memory and storage (not shown). Each user interface device 110 is typically running an operating system configured to manage interaction between the computer hardware and the higher level software running on user interface device 110 as known to an artisan of ordinary skill in the art.

Database 120 may include a database management system (not shown). The database management system (DBMS) may include software applications configured to manage database 120. In one embodiment, users interact with user interface device 110 to compose and submit a query to the DBMS for processing. In another embodiment, users interact with user interface device 110 to compose and submit a query to a database 150 via a corresponding ISP 140. Navigating the enmeshed directory in both directions benefits from a graphical user interface (GUI).

The above described information delivery system utilizes computing devices located in one or more portions of the system to implement the below embodiments of multi-level and enmeshed directory structures to achieve specific goals. For example, content delivery, bandwidth management, link restoration/protection and other functions may be more readily visualized, managed and/or and adapted to customer needs using the methodologies and techniques of the various embodiments, as discussed in more detail below.

Figure 2:
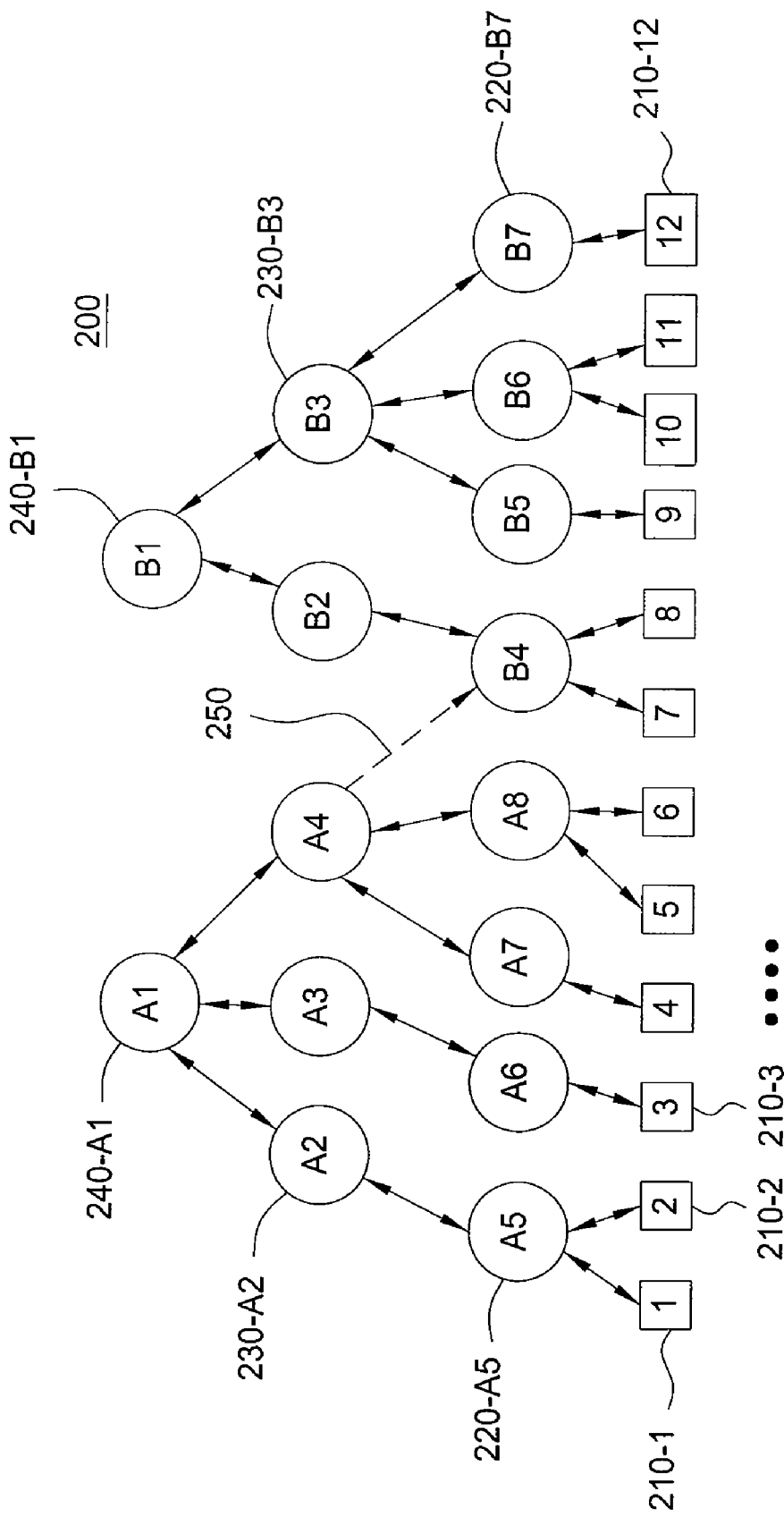
FIG. 2 graphically depicts a Simple Directory Structure of a file system.

FIG. 2 graphically depicts a Simple Directory Structure of a file system which associates an object with a unique descriptor such as a filename contained in a directory. Specifically, each of a plurality of objects denoted as 210-1, 210-2 and so on up to 210-12 (collectively objects 210) is linked to one of eight descriptors (A5-A8; B4-B7) at a first hierarchical level, denoted as level 220. Each of the descriptors at the first hierarchical level 220 is linked to one of six descriptors (A2-A4; B2-B3) at a second hierarchical level 230. Each of the descriptors at the second article level 230 is linked to one of two descriptors (A1; B1) at a third hierarchical level 240.

These descriptors themselves can then be recursively associated with another higher-level descriptor. Thus, a hierarchical descriptor structure is realized, such as a file-system directory, wherein there is a unique chain of descriptors that lead to an object. There can be multiple paths to lead a single object such as a file using hard/symbolic links, but one can infer only one path by a descriptor traversal starting from the object itself. This system is referred to as the simple directory structure. A symbolic link 250 is shown as a dotted arrow between descriptor A4 and descriptor B4.

In the simple directory structure shown in FIG. 2, given two objects in the directory, there is only one way in which these objects can be related. For example, if two of the objects were cat-1 and cat-2, this structure can describe them as pets, or as felines, but not simultaneously both, since the set of objects described by pets and felines are not full subsets of each other. In the flat-tag structure, both descriptors could be used to describe each object, but since both of these objects belong to a multitude of categories, such as animals, mammals, furry, etc., it would be necessary to assign all of these descriptors to each object. Thus, it is easily seen that the flat-tag structure is not scalable at all when it is desired to provide a high level of description to objects.

A typical file system may contain thousands (or even hundreds of thousands) of directories. Files are kept organized by storing related files in the same directory. A directory contained inside another directory is called a subdirectory of that directory. Together, the directories form a hierarchy, or tree structure. A working directory of a process is a directory of a hierarchical file system, if any, dynamically associated with each process. When the process refers to a file using a simple file name or relative path (as opposed to a file designated by a full path from a root directory), the reference is interpreted relative to the current working directory of the process. So for example, a process with working directory "/pet-feline" that asks to open the file "animals.txt" will end up opening the file "/pet-feline/ animals.txt." The home directory is a file system directory, which contains the personal files of a given user of the system. The root directory is the first or top-most directory in a hierarchy. It can be likened to the root of a tree—the starting point where all branches originate. The parent directory of a given directory 'A' is the directory 'B' in which 'A' is located. In A's absolute path, B is the predecessor of A.

In the present embodiment, an object is described by any number of descriptors. For example, in Web 2.0 tagged systems and similar sites, each object (e.g., pictures) is described by a set of tags. The embodiments described herein enable the description of hierarchical levels of descriptors for these tags using the enmeshed directory structure. As such, the relationships among any set of descriptors in the enmeshed graph can be defined as the set of objects that are described by all of the descriptors in this set (i.e., the pictures can be described by a set of tags).

Figure 3:
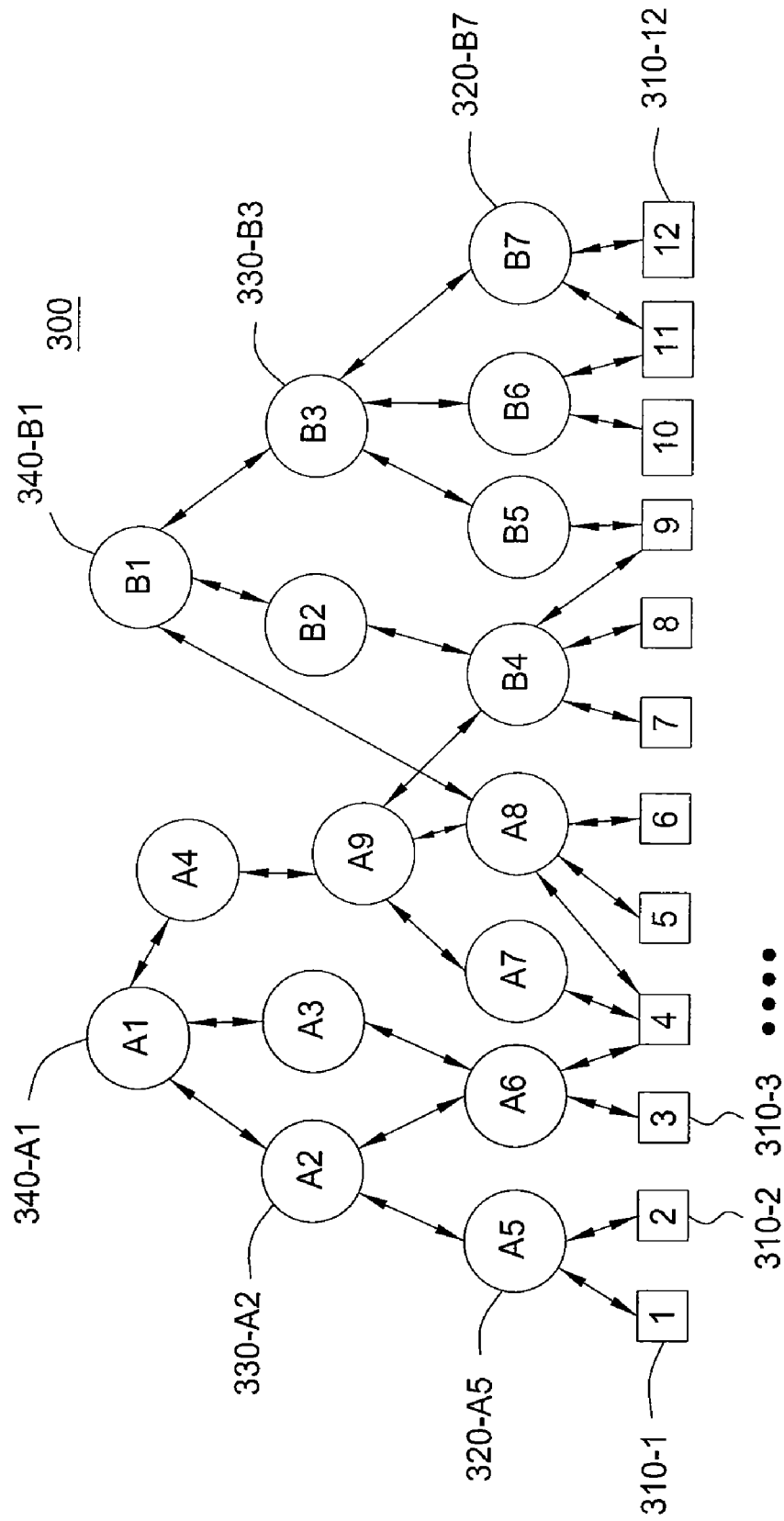
FIG. 3 graphically depicts an Enmeshed Directory Structure of a file system according to one embodiment.

FIG. 3 graphically depicts an Enmeshed Directory Structure of a file system according to one embodiment. Specifically, each of a plurality of objects denoted as 310-1, 310-2 and so on up to 310-12 (collectively objects 310) is linked to one or more of eight descriptors (A5-A8; B4-B7) at a first hierarchical level, denoted as level 320. Each of the descriptors at the first hierarchical level 320 is linked to one or more of six descriptors (A2-A4; B2-B3) at a second hierarchical level 330. Each of the descriptors at the second article level 330 is linked to one or more of two descriptors (A1; B1) at a third hierarchical level 340.

The resultant enmeshed graph is an acyclic-relationship graph with all paths ending at an object. The intermediate nodes in the graph are descriptors, with the predecessor of each descriptor being a superset of the descriptor. The edge/link between the descriptor and its predecessor is denoted as a 'proper link', indicating that the descriptor is a 'proper subset' of its predecessor such that everything described by this descriptor is also described by the predecessor. Thus, a hierarchical descriptor structure is provided which can be used to describe objects in multiple ways. Specifically, there are at least two (2) paths to object 110-11 from descriptor B1. They are: 340-B1→340-B3→340-B6→110-11 and 340-B1→340-B3→340-B7→110-11.

In other embodiments, each object descriptor by itself can be described by more than one different descriptor, in the same way as objects are described by descriptors. For example, descriptor 320-B4 can be described by the following descriptors: (1) 340-B1→340-B2→340-B4; and (2) 340-A1→340-A4→340-A9→340-B4.

Any two descriptors can be related if they have at least one object commonly described by them. While these need not be marked explicitly as part of the directory structure, it is possible to infer them with a relationship metric defined on a set of descriptors, P. First, the set of common objects described by all descriptors in P, the intersection set I(P) are considered. The sets $i(P)=|I(\{A \in P\})|=|\cap_{A \in P} T(A)|$ have the same cardinality (i.e., there is a bijection between them). Now, the relationship metric is defined as: $r(P)=i(P)/|\cup_{A \in P} T(A)|$.

In one embodiment, the list of objects/descriptors that are described by a single descriptor is accessible, whereas in other embodiments, the set of descriptors that describe a single object/descriptor is accessible. Two relations are defined: A→B may be formally defined as "A describes B, i.e. A is a descriptor of B." Similarly, A←B is defined as "A is described by B, i.e., B is a descriptor of A." The relationship is also transitive, i.e. if A→B→C, then it implies A→C. Associativity also holds true, i.e., (A→B)→C is the same as A→(B→C).

Furthermore, let the set of objects/descriptors described by a tag A be denoted by S(A). Within S(A), let the set of objects alone be T(A). Each object descriptor, A, has a level associated with it, denoted by l(A). Objects are at level 0. The level of an object descriptor A, is given by $$l(A) = 1 + \max_{B \in S(A)} l(B).$$

This ensures that the relationship A→B is acyclic within the directory structure. In other words, a relationship of the form A→B→C→ . . . →A, where a descriptor describes itself, is prohibited by definition in the enmeshed structure of the present embodiments. If such a relationship were possible, then l(A)>l(B)>l(C)> . . . >l(A), which is false. Thus, the multi-level enmeshed directory structure of the present embodiments contain objects described by multiple object descriptors, which can be thought of as tags. Each object can be accessed by any one of the descriptors that describe the object and the descriptors of an object are also accessible.

In one embodiment of the system 100 of FIG. 1, the GUI presents both the hierarchical relationship or entity "descriptors/objects" described by particular descriptor using 'proper links' and the descriptors describing the hierarchical relationship or entity "object/descriptor" using 'proper links.' In another embodiment, the GUI differentiates between the hierarchical relationship or entity "descriptors/objects" described by particular descriptor using 'proper links' and the descriptors describing the hierarchical relationship or entity "object/descriptor" using 'proper links.' Various embodiments will be described in more detail below.

Figure 4:
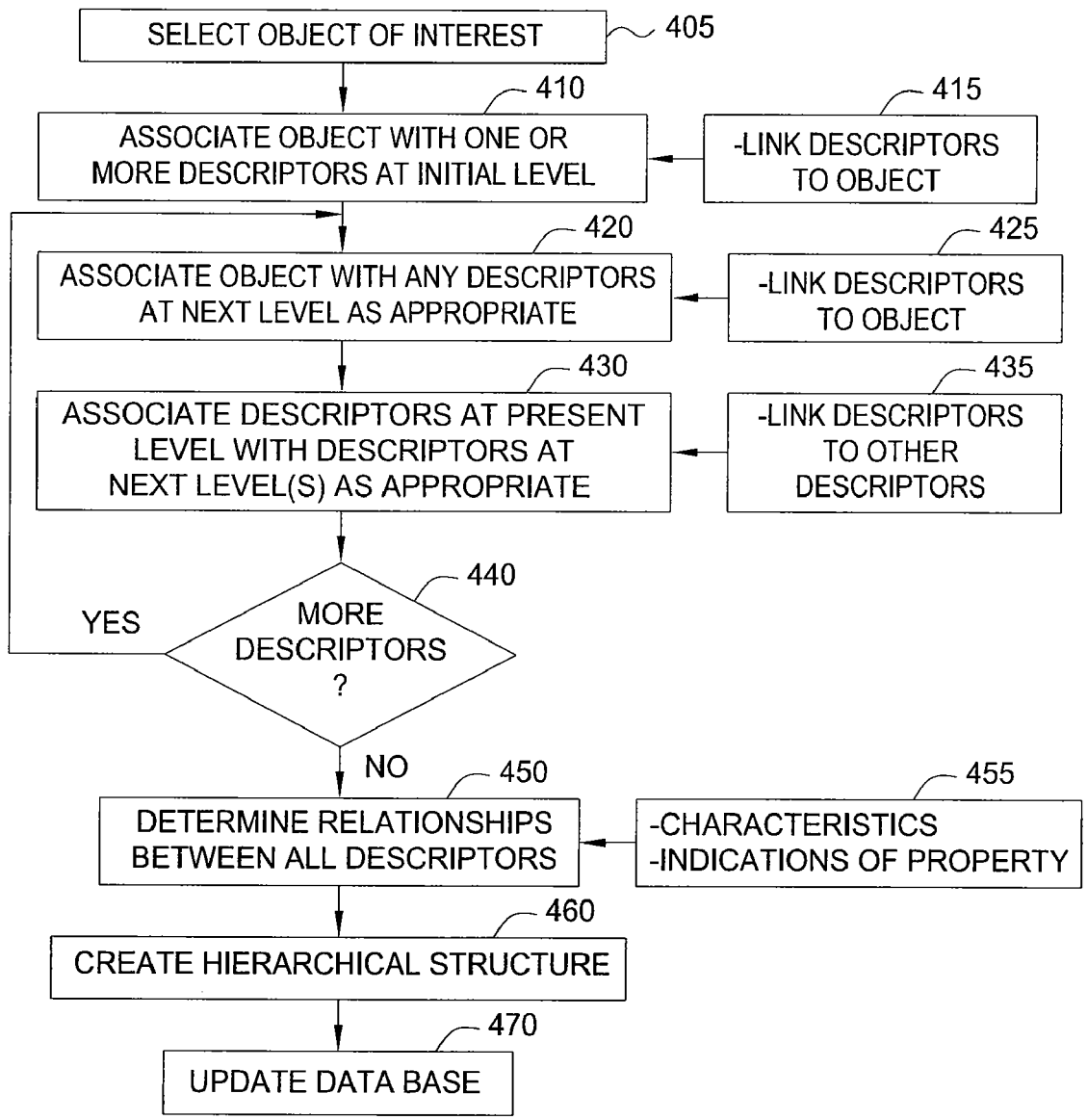
FIG. 4 depicts a flow diagram of a method for generating a multi-level enmeshed directory structure according to one embodiment.

FIG. 4 depicts a flow diagram of a method for generating a multi-level enmeshed directory structure according to one embodiment. The method 400 is entered at step 405 where an object of interest is selected. At step 410, the object of interest is associated with one or more descriptors at an initial hierarchical level. Referring to box 415, the one of more descriptors are linked to the object of interest.

At step 420, the object of interest is associated with any appropriate descriptors at a next hierarchical level. Referring to box 425, these descriptors are linked to the object of interest.

At step 430, the descriptors of the present hierarchical level are associated with any appropriate descriptors at one or more next hierarchical levels. Referring to box 435, the present hierarchical level descriptors are correspondingly linked as appropriate to the descriptors at one or more next hierarchical levels.

At step 440, a query is made as to whether more descriptors need to be processed. That is, at step 440 a query is made as to whether descriptors at further hierarchical levels have yet to be processed with respect to either or both of the object of interest and/or the already processed descriptors. If more descriptors need to be processed, then steps 420-430 are repeated for the next hierarchical level.

At step 450, the relationships between all of the descriptors are determined. Referring to box 455, these relationships are indicative of various properties, such as the characteristics of a system or entity that is modeled by the objects/descriptors processed herein. Specific examples of such relationships are discussed herein with respect to various embodiments and examples. In generally, these relationships provide data useful in viewing, adapting, diagnosing problems with and/or managing complex systems modeled using the directory structures discussed herein with respect to the various embodiments.

At step 460, the multi-level hierarchical database structure is created (or updated) and, at step 470, the database storing the multi-level hierarchical database structure is updated accordingly.

Figure 5:
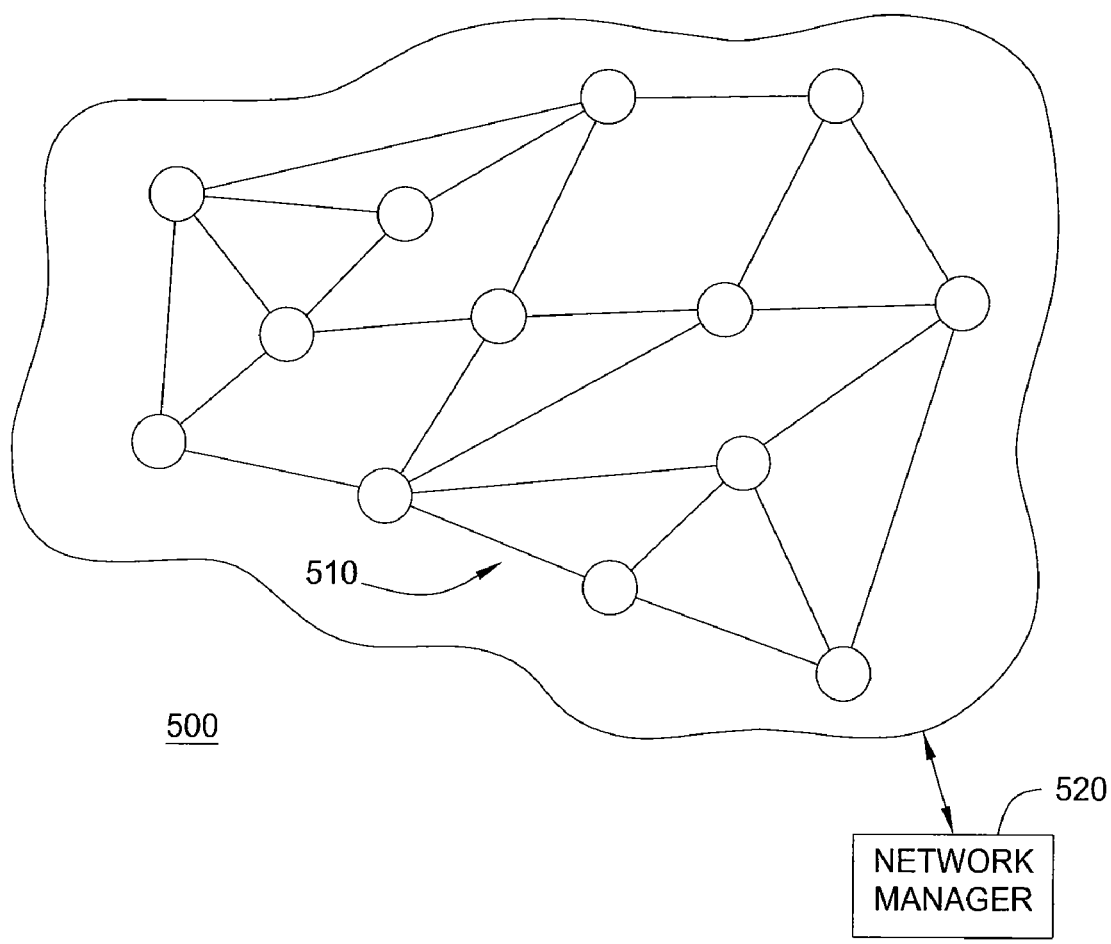
FIG. 5 depicts a high-level block diagram of a mesh network according to one embodiment.

FIG. 5 depicts a high-level block diagram of a mesh network according to various embodiments described herein. Specifically, the mesh network 500 of FIG. 5 includes a plurality of interconnected nodes 510 and a network manager 520. It will be appreciated by those skilled in the art that the network 500 depicted in FIG. 5 is only exemplary. Various embodiments may include different network topologies and/or networks with different numbers of nodes. The network may be a multi-layer network and/or multi-service network. Each of the nodes 510 is connected to (linked to) some number of other nodes. The nodes may comprise routers, switches, optical add-drop multiplexers (OADMs), radio nodes, gateways and/or other network elements. Traffic flows between the various nodes via optical links, electrical links and/or combination optical links and electrical network links. The traffic may comprise voice traffic or data traffic. The traffic may comprise Voice over IP (VoIP), IP Television (IPTV), streaming media/content, email and so on. The traffic may be unicast of multicast.

The network manager 520 is depicted as managing the entire network 500 from a remote location. However, it will be appreciated by those skilled in the art that the network manager 520 may be operatively coupled to one or more nodes. Moreover, multiple network managers may be distributed throughout the network to produce a cooperative distributive network manager.

The network manager 520 comprises a computing system having, illustratively, an input/output (I/O) interface, a data processor and a memory. Methodologies according to embodiments of the invention can be performed by instructions from software that is stored in computer executable form in the memory and/or executed by the processor.

In one embodiment, the network manager 520 comprises, illustratively, an Integrated Transport Management Network Manager (ITM-NM) manufactured by Alcatel-Lucent of Murray Hill, N.J. The network manager 520 implements network management layer functions according to, for example, the telecommunications management network (TMN) standards described in the International Telecommunications Union (ITU) recommendation M.3010 and related documents, which are incorporated herein by reference in their entirety. Thus, the network manager 520 is used to manage network elements within the communication system 500 of FIG. 5, both individually and as a set of network elements. The network manager 510 is operatively coupled to, illustratively, one or more element management systems (not shown). An element management system (EMS) controls a specific group of network elements, such as digital cross connect (DCS) element, SONET elements and so on.

In one embodiment, the directory structure disclosed herein is adapted to view, configure and analyze multi-cast streams in networks, such as IPTV networks, where the relationship metric can be used to infer the viewing behaviors of end users. It is also useful in describing multi-level hierarchical policing/scheduling/shaping functions where a single flow can belong to various classes (as opposed to the traditional view where a single flow belongs to only one class).

For example, in one embodiment where a content server is multicasting to a plurality of client servers, the top level descriptors are the servers serving content, and the lowest level objects are the end users or client servers (level 0). Each end-user can receive multiple flows (which are level 1 descriptors), and these flows are, in turn, served by multiple routers (level 2). These routers form a network (multiple levels>=2) all the way up to the content servers. This communication path is characterized by a plurality of different metrics, some of which may be of interest, wherein each metric provides a different relationship definition. Metrics of interest comprise: (1) latency; (2) capacity and (3) path length.

Latency as a metric refers to the delay (e.g., one hop delay) between two adjacent descriptors/objects. Relative to this metric, the relationships among any set of descriptors in an enmeshed graph can be categorized as min/max/average latency to reach users from all accessible members of this descriptor group. Capacity as a metric refers to the bandwidth of a link between two adjacent descriptors/objects. Relative to this metric, the relationship among any set of descriptors in the enmeshed graph can be defined as minimum bottleneck bandwidth for those users who are accessible from all members of this descriptor group. Path length as metric refers to a link between two adjacent descriptors/objects. Relative to this metric, the relationship among any set of descriptors in the enmeshed graph can be defined as min/max/average path length to reach users from all accessible members of this descriptor group. This is useful to determine the minimum/max/total number of router upgrades/bandwidth reservations that a service provider needs to attend to, for example. Furthermore, network outage statistics by virtue of relating nodes conveying multicast streams may be determined. Additionally, the various embodiments may be used to determine the number of flows affected by the failure of one or more nodes (or links), or sets of nodes or links in the network.

In another embodiment, the directory structure disclosed herein is adapted to analyze social networks where an object (e.g., a person) has multiple networks to which the object may belong. The use of this enmeshed structure and the relationship metric, along with the intersection set will help analyze these social network structures and mine the wealth of data that may be generated by the possible relationships that are present in such a network.

In various embodiments, the network manager is adapted to manage the mesh network and perform a method for creating a multi-level hierarchical directory structure as discussed herein. The network manager may comprise a graphical user interface (GUI) to assist a user in navigating the resulting enmeshed directory. The GUI may present both descriptors/clients described by particular descriptor using proper links and the descriptors describing the client/descriptor using proper links.

On embodiment comprises a content server multicasting to a plurality of client servers in a network system adapted to perform a method for creating a multi-level hierarchical directory. This embodiment includes linking each of a plurality of client servers to multiple respective descriptors, each of the descriptors being linked with one or more predecessor descriptors wherein a top level predecessor descriptor corresponds to the content server; and identifying a single descriptor that links a list of client servers and two or more predecessor descriptors linking a single descriptor to thereby establish relationships between different descriptors relative to themselves and to the initial client server. In one embodiment, a graphical user interface (GUI) is generated to visualize navigation of the enmeshed directory in both directions, the GUI presenting both descriptors/client servers described by a particular descriptor using proper links and descriptors describing the client server/descriptor using proper links. Each descriptor can be associated with one or more predecessor descriptors and the relationships of the client server to the one or more descriptors is acyclic. The network may comprise a social network in which the plurality of client servers comprise one or more end users accessing the network.

Various embodiments are implemented using one or more general-purpose computers. In particular, the processing or functionality of the various Figures can be implemented as software, or a computer program, executing on the computer(s). The method or process steps for implementing the embodiments are effected by instructions in the software. The software may be implemented as one or more modules for implementing the process steps. A module is a part of a computer program that usually performs a particular function or related functions. Also, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer effects advantageous apparatuses for implementing the various embodiments.

In one embodiment, a computer system includes a computer, a video display, and input devices. In addition, the computer system can have any of a number of other output devices including line printers, laser printers, plotters, and other reproduction devices connected to the computer. The computer system can be connected to one or more other computers via a communication interface using an appropriate communication channel such as a modem communications path, a computer network, or the like. A computer network or other data link may include a local area network (LAN), a wide area network (WAN), an Intranet, and/or the Internet.

The computer itself in one embodiment consists of a central processing unit(s) (simply referred to as a processor hereinafter), a memory which may include random access memory (RAM) and read-only memory (ROM), input/output (IO) interfaces, a video interface, and one or more storage devices. The storage device(s) can consist of one or more of the following: a floppy disc, a hard disc drive, a magneto optical disc drive, CD-ROM, magnetic tape or any other of a number of non-volatile storage devices well known to those skilled in the art. Each of the components is typically connected to one or more of the other devices via a bus that in turn can consist of data, address, and control buses.

Typically, the processes of the embodiments are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a computer readable card such as a PCMCIA card, and the Internet and Intranets including email transmissions and information recorded on web sites and the like. The foregoing are merely examples of relevant computer readable mediums. Other computer readable mediums may be practiced without departing from the scope and spirit of the invention.

Figure 6:
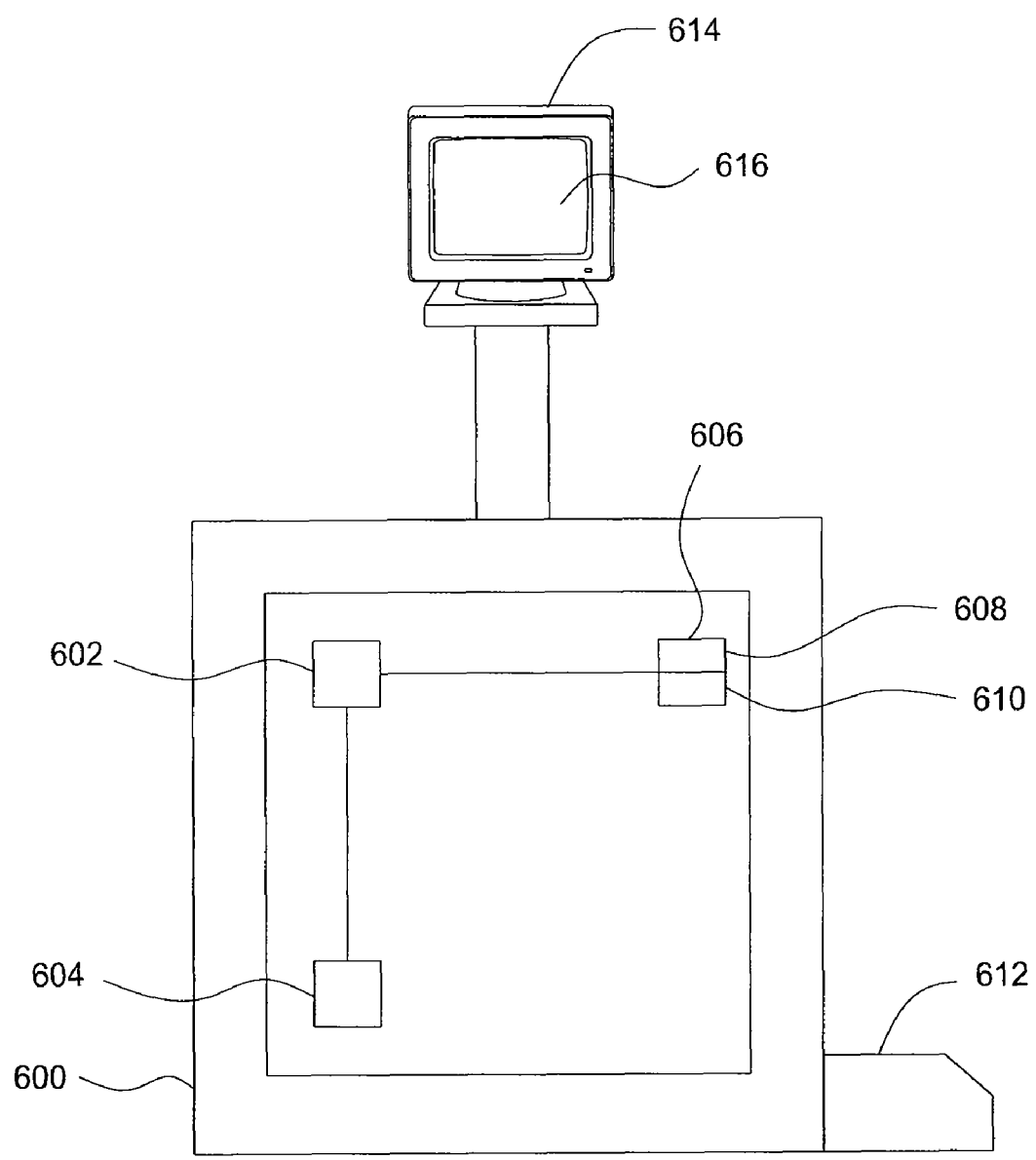
FIG. 6 depicts a typical computer suitable for use in implementing various embodiments.

FIG. 6 depicts a computer 600 (personal computer, networked workstation, network server or the like) suitable for use in implementing various embodiments. Specifically, the computer 600 may be used to implement any of the elements in the various Figures that perform a computing function, including database processors, servers, user interface devices, network nodes, routers, switches, network management systems, element management systems and so on. The computer 600 includes at least one central processing unit (CPU) 602, support circuits 604, and memory 606. The CPU 602 may comprise one or more conventionally available microprocessors. The support circuits 604 are well known circuits that comprise power supplies, clocks, input/output interface circuitry and the like. Memory 606 comprises various types of computer readable medium including, but not limited to random access memory, read only memory, removable disk memory, flash memory and various combinations of these types of memory. The memory 606 is sometimes referred to as main memory and may in part be used as cache memory or buffer memory. The memory 606 stores various software packages 608-610 that perform operations essential to the computer 600 and/or interconnected workstations, servers and the like. When running a particular software package or program 608-610, such as packages or programs implementing the methodologies and techniques of the present embodiments, the computer 600 becomes a special purpose machine for implementing these various embodiments, methodologies and techniques described herein with respect to the various Figures and as described above.

The computer may contain one or more interfaces 612 selected from the group consisting of a keyboard, mouse, touch screen, keypad, voice activated interface for entering data and/or executing management command functions in the network including but not limited to the configuration of the sniffer as a partition designated node as described above. Such information can be displayed in a network status display 616 on display device 614.

One embodiment of the invention is implemented as a program product for use with a computer system. The program(s) of the program product defines functions of the embodiments (including the methods described herein) and can be contained on a variety of computer readable storage media. Illustrative computer readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard disk drive or random access memory) on which alterable information is stored. Such computer readable storage media, when carrying computer readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer readable instructions that direct the functions of the present invention, are embodiments of the present invention. Broadly, computer readable storage media and communications media may be referred to herein as computer readable media.

While the foregoing is directed to various embodiments of the present invention, other and further embodiments of the invention may be devised without departing from the basic scope thereof. Thus, the invention should not be limited to use solely in any specific application identified and/or implied by such illustration. As such, the appropriate scope of the invention is to be determined according to the claims, which follow.

What is claimed is:

1. A method for generating a multi-level hierarchical directory structure and establishing relationships between descriptors, the method comprising:
  selecting an initial data object;
  creating one or more descriptors associated with the data object wherein each of said descriptors are further associated with one or more corresponding descriptors thereby forming a multi-level relational tree;
  determining the relationship between the one or more descriptors;
  creating a hierarchical structure linking the different levels of descriptors;
  updating a corresponding database; and
  identifying a single initial descriptor that links a plurality of descriptors and two or more predecessor descriptors linking another single descriptor to thereby establish relationships between different descriptors relative to themselves and to the single initial descriptor.

2. The method of claim 1, wherein each descriptor can be related to one or more predecessor descriptors thereby forming a hierarchical relationship.

3. The method of claim 1, wherein each descriptor can be associated with one or more predecessor descriptors and the relationship of the object to the one or more predecessor descriptors is acyclic.

4. The method of claim 1, further comprising determining the relationships between different descriptors relative to themselves and to the initial data object.

5. The method of claim 1, wherein the operation further comprises a graphical user interface (GUI) to navigate the enmeshed directory in both directions, said GUI presents both descriptors or objects described by a particular descriptor using proper links and the descriptors describing the object or descriptor using proper links.

6. A network management system communicatively coupled to one or more element management systems adapted to perform a method for creating a multi-level hierarchical directory structure and establishing relationships between descriptors, comprising:
  a processor for executing software instructions received from a memory to perform thereby a method for, the method comprising:
  linking each of a plurality of data objects to multiple respective descriptors, each of said descriptors being linked with one or more predecessor tags; and
  identifying a single initial descriptor that links a plurality of descriptors and two or more predecessor descriptors linking another single descriptor to thereby establish the relationships between different descriptors relative to themselves and to the single initial descriptor.

7. The system of claim 6, wherein the operation further comprises a graphical user interface (GUI) to navigate the enmeshed directory in both directions, said GUI presents both descriptors or objects described by a particular descriptor using proper links and the descriptors describing the object or descriptor using proper links.

8. The method of claim 6, wherein the relationships of the object to the one or more descriptors is acyclic.

9. A mesh network system comprising a processor, a network manager adapted to manage the mesh network and perform a method for creating a multi-level hierarchical directory structure and establishing relationships between descriptors, the method comprising:
  linking each of a plurality of mesh clients and nodes to multiple respective descriptors, each of said descriptors being linked with one or more predecessor descriptors; and
  identifying a single initial descriptor that links a list of mesh clients and two or more predecessor descriptors linking another single descriptor thereby establishing the relationships between different descriptors relative to themselves and to the single initial mesh client.

10. The mesh network system of claim 9, wherein the network manager further comprises a GUI to navigate the enmeshed directory in both directions, said GUI presenting both descriptors or objects described by particular descriptor using proper links and the descriptors describing the client or descriptor using proper links.

11. The mesh network system of claim 9, wherein the client is one of a radio node, a router, a gateway.

12. The mesh network system of claim 9, wherein the relationships of the client to the one or more descriptors is acyclic.

13. A computer readable storage medium for storing instructions which, when executed by one or more processors communicatively coupled to a network, perform a method for creating a multi-level hierarchical directory structure and establishing relationships between descriptors, comprising:
  linking by a device an object to multiple descriptors describing said object, each of said descriptors being identified by one or more predecessor descriptors linked to the descriptor; and
  identifying a single initial descriptor that links a plurality of descriptors and two or more predecessor descriptors linking another single descriptor to thereby establish relationships between different descriptors relative to themselves and to the single initial descriptor.

14. The computer readable medium of claim 13, wherein navigating the enmeshed directory in both directions requires the GUI, said GUI presents both descriptors or objects described by a particular descriptor using proper links and the descriptors describing the object or descriptor using proper links.

15. The computer readable medium of claim 13, wherein the relationship of the object to the one or more descriptors is acyclic.

16. The computer readable medium of claim 13, further comprising determining the relationships between different descriptors relative to themselves and to the initial data object.

17. A content server comprising a processor, said content server multicasting to a plurality of client servers in a network system adapted to perform a method for creating a multi-level hierarchical directory and establishing relationships between descriptors, the method comprising:
  linking by the content server each of a plurality of client servers to multiple respective descriptors, each of said descriptors being linked with one or more predecessor descriptors wherein a top level predecessor descriptor corresponds to the content server; and
  identifying a single initial descriptor that links a plurality of client servers and two or more predecessor descriptors linking another single descriptor to thereby establish relationships between different descriptors relative to themselves and to the single initial client server.

18. The content server of claim 17, further comprising generating a graphical user interface (GUI) to visualize navigation of the enmeshed directory in both directions, said GUI presenting both descriptors or clients servers described by a particular descriptor using proper links and descriptors describing the client server or descriptor using proper links.

19. The network system of claim 17, wherein each descriptor can be associated with one or more predecessor descriptors and the relationships of the client server to the one or more descriptors is acyclic.

20. The network system of claim 17, wherein the network further comprises a social network and the plurality of client servers comprise one or more end users.

* * * * *